May 15, 1956     S. A. AYRES     2,745,753
PIE CRUST PACKAGE AND METHOD OF MAKING SAME
Filed Aug. 4, 1951
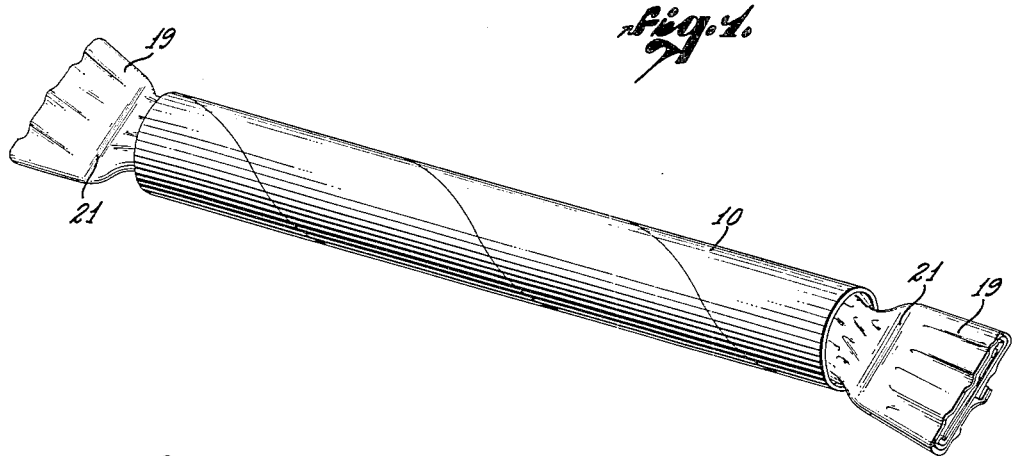
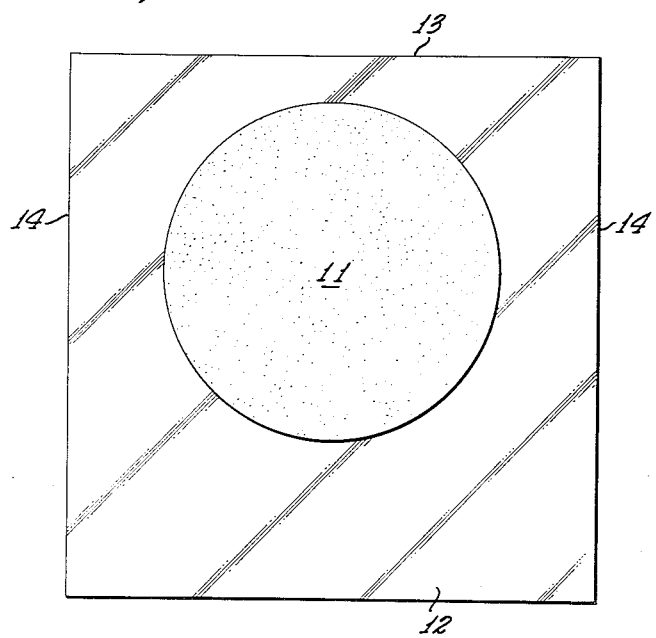
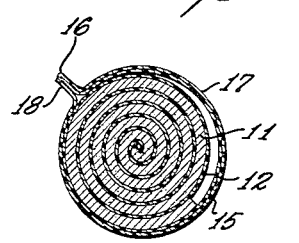
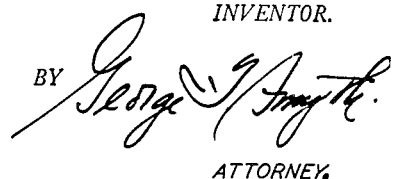
SARAH ANN AYRES,
INVENTOR.
BY
ATTORNEY.

United States Patent Office 2,745,753
Patented May 15, 1956

2,745,753

PIE CRUST PACKAGE AND METHOD OF MAKING SAME

Sarah Ann Ayres, Hermos Beach, Calif.

Application August 4, 1951, Serial No. 240,431

6 Claims. (Cl. 99—172)

This invention relates to food packages and more particularly to a package of uncooked pie dough and the method of forming the same.

It has long been a desire in the art to provide a package for uncooked pie crust dough which was hermetically sealed so that the package could be stored without danger of contamination. Pie crust packages heretofore proposed have not been feasible as the same were not hermetically sealed and, therefore, could not be sold in the usual commercial channels of food stuffs.

Prior dough packages have also been objectionable for the reason that the dough after it had been formed into a sheet was wrapped about a relatively rigid mandrel which was left in place after the dough was packaged. This mandrel brought about several disadvantages. The weight of the mandrel tended to thin the convolutions of the dough on which the mandrel was supported and this thinning was more pronounced the longer the package remained in storage. In addition to this thinning, the mandrel also created a pressure in the lowermost layers or convolutions of the dough to cause the shortening to "flow" outwardly from the maximum pressure area. Once this occurred the resulting pie crust, after the cooking operation, was not uniform in thickness or texture.

In the package of the present invention the dough, after it is formed into a relatively thin sheet of the desired shape, is not rolled about a mandrel but merely placed upon a single sheet of suitable material. The sheet of material is greater in width than the corresponding dimension of the dough and has a length greater than the width. The dough is placed on the sheet intermediate the opposite marginal edges and adjacent the one end thereof. After the dough is so placed on the sheet, the latter can be grasped by suitable means at the opposite marginal portion thereof and rolled to form a substantially solid cylindrical mass.

After the sheet has been rolled to completely enclose the dough, the remaining portion of the sheet is reversely bent back upon itself to form a laterally or radially extending tab longitudinally extending the length of the cylindrical mass. After the sheet has been reversely bent back upon itself to form this tab, the remainder of the sheet is passed around the cylindrical mass to form an outer convolution extending in a direction opposite to the other convolutions. The extremity of this outer convolution is then brought into facewise engagement with the one face of the tab after which the engaged faces are heat and pressure bonded together to form a hermetic seal extending longitudinally of the roll or cylindrical mass.

As the sheet is of a width greater than the corresponding dimension of the dough, the opposite marginal portions of the sheet extend outwardly beyond the opposite sides of the now rolled dough. These outwardly directed portions of the sheet are suitabily flattened just beyond the edges of the dough, after which heat and pressure is applied to hermetically seal the opposite ends of the cylindrical mass. In the now preferred method of forming the food package of the present invention, the sealing of the opposite end portions is not brought about until after the cylindrical mass is inserted into an open ended cylindrical casing of a length just slightly greater than the length of the rolled dough.

After the cylindrical mass formed by the rolled sheet and dough is disposed in the open ended casing, the heat and pressure operation necessary to hermetically seal the opposite ends of the package is carried out. The casing is sufficiently rigid to protect the rolled dough during this heat and pressure bonding operation. Once the opposite ends of the package have been hermetically sealed the extreme ends of the sheet are, of course, flattened and form retaining members for holding the cylindrical mass from accidental separation from the casing.

As no mandrel is used in the food package of the present invention, a further advantage is had over prior packages in which the dough is wrapped about a mandrel, as the convolutions of dough tend to cushion themselves and are not so liable to injury as prior packages when the same is subject to impact blows in shipment or handling.

Other features and advantages of the present invention will be hereinafter apparent from the following description, particularly when taken in connection with the accompanying drawing, in which Figure 1 is a perspective view of the food package of the present invention;

Figure 2 is a plan view showing the dough after it has been formed into the desired shape and in position on the protective sheet;

Figure 3 is an elevational view of the dough superimposed on the protective sheet; and Figure 4 is a transverse section of the package removed from the outer casing.

The food package of the present invention, referring now to the drawing and more particularly to Figure 1 thereof, comprises an open ended cylindrical casing 10 of some suitable material. The casing 10 preferably should be sufficiently rigid to normally protect the rolled sheet of dough carried within the same and preferably is formed of a suitable card board or like material.

In the now preferred method of forming the package of the present invention, after the dough has been rolled into a flat, relatively thin sheet, it is formed into a predetermined shape and size. It is to be understood that the dough of my package is prepared and ready for baking purposes and may be cut in sheets of various shapes and sizes although in the illustrated embodiment of the present invention the sheet of dough 11 is shown as circular in shape.

After the sheet of dough is formed into the desired shape, it is placed upon a sheet 12 of some suitable material such as cellulose acetate or other material which is impervious to moisture and grease. The sheet 12, particularly where the dough is circular in shape, is rectangular in shape and is formed of a width greater than the diameter of the dough. The length of the sheet 12 is greater than its width and in the preferred form of the method, the dough is placed adjacent the one end 13 of the sheet and intermediate the opposite marginal edges 14 thereof. After the dough 11 has been so placed on the sheet 12, the end portion 13 may be grasped by any suitable means and the sheet 12 with the dough 11 is helically rolled into a substantially cylindrical mass as clearly shown in Figure 4.

After the sheet 12, referring now to Figure 4, has been rolled with the dough 11 to completely enclose the latter, the extending end of the sheet 12 is brought into engagement with the next inwardly disposed convolution as indicated at 15, after which this end is reversely bent back upon itself to form a double ply, radially extending tab 16 extending longitudinally of the length of the partially formed package. The remaining portion of the sheet is now passed about the cylindrical mass in a direction opposite to the other convolutions of the sheet to form a convolution 17 which serves an outer wrapping for the mass. The extremity of this convolution or wrapper is then laterally bent to form a single ply tab 18 which is brought into facewise engagement with the one face of the tab 16. By a conventional heat and pressure operation the contacting or engaged faces of the two tabs are now bonded together to form a hermetic seal extending the entire length of the mass.

The thus formed mass is now inserted into the open ended casing 10 which is of a length slightly greater than the diameter of the dough 11. The mass is held in position within the casing in a position in which the opposite edges of the dough are slightly spaced inwardly from the opposite ends of the casing 10, after which the protruding ends of the sheet 12 are then flattened to form the flares 19. After the flares 19 are formed, the individual layers or now flattened convolutions of the sheet 12 are bonded together by a conventional heat and pressure operation along a line indicated by the reference character 21. As this operation is completed after the rolled dough and sheet 12 is inserted into the casing 10, which, it will be remembered, is somewhat longer than the diameter of the dough, there is little danger of the dough being damaged during this sealing operation.

The flares 19 are of a width substantially greater than the diameter of the casing 10 and act as retaining means for preventing accidental movement of the dough longitudinally of the casing 10 and no other means need be used to retain the rolled dough within the casing 10. When it is desired to remove the dough from the casing 10 it is merely necessary to compress the flares sufficiently to permit the passage of one flare through the casing 10. The flares 19 also prevent the cylindrical casing 10 from rolling as when the package is placed on a shelf or stacked for display and sale purposes.

As the dough is hermetically sealed within the wrapper formed by the sheet 12, there is no danger of contamination and it has been found that the package of the present invention may be stored without refrigeration for an indefinite length of time.

As no internal means, such as a mandrel, is used with the package of the present invention, the convolutions of the dough tend to maintain their original thickness and composition so that the texture of a pie crust made with the dough sheet of the present package is uniform. The absence of a rigid mandrel about which the dough is wrapped also results in a more uniform cushioning or distribution of pressure occasioned by impact blows and shocks taken by the package during shipping and handling than previously proposed packages in which the dough was wrapped about a mandrel.

It should now be seen that the present invention provides a method of packaging raw or uncooked pie crust dough in such a way that the dough is hermetically sealed and preserved in a fresh condition for baking upon opening of the package. When it is desired to open the package, it is merely necessary to remove one of the flares 19 after which the package can be easily slipped from the casing 10. With the one flare removed the hermetic seal effected at the inner face of the tab 16 and the extremity 18 of the sheet can be separated after which the other flare can be removed and the sheet unrolled to expose the dough 11. The dough is now ready for immediate use and can be placed directly from the sheet 12 into a pie pan or other cooking utensil.

Although the now preferred embodiment of the present invention has been shown and described herein it is to be understood that the invention is not to be limited thereto, for it is susceptible to changes in form and detail within the scope of the appended claims.

I claim:
1. The method of packaging pie crust dough, comprising the steps of: placing an uncooked pie crust dough of a preselected size and shape on a sheet of a water and grease impervious material of a size greater than the size of said dough; helically wrapping the sheet with said dough to form a substantially cylindrical mass; reversely bending the outer extremity of said sheet back upon itself to form a tab extending longitudinally of said mass; passing the reversely bent extremity of said sheet around said mass and facewisely engaging the terminus thereof with said tab; bonding the engaged faces to form a hermetic seal extending longitudinally of said mass; inserting said mass into a cylindrical casing sufficiently rigid to protect the rolled dough and of a length greater than the width of said dough and less than the width of said sheet; flattening the oppositely extending portions of said sheet; and bonding the flattened convolutions of said sheet closely adjacent the opposite ends of said casing to hermetically seal the opposite ends of said mass.

2. The method of packaging pie crust dough, comprising the steps of: placing an uncooked pie crust dough of a preselected size and shape on a sheet of a water and grease impervious material of a size greater than the size of said dough; forming a substantially cylindrical mass by helically wrapping the sheet with said dough to completely enclose the latter; bringing the extending end portion of said sheet in engagement with the next inwardly disposed convolution of said sheet; reversely bending the outer extremity of said sheet back upon itself to form a longitudinally extending tab; passing the reversely bent extremity of said sheet around said mass and facewisely engaging the terminus thereof with said tab; bonding the engaged faces to form a hermetic seal extending longitudinally of said mass; mounting about said mass a cylindrical casing having sufficient rigidity to protect the dough and of a length greater than the width of said dough and less than the width of said sheet; flattening the oppositely extending portions of said sheet; and thereafter bonding the flattened convolutions of said sheet closely adjacent the opposite ends of said casing to hermetically seal the opposite ends of said mass.

3. A packaged food product comprising: an unbaked pie crust helically wrapped with a sheet of a water and grease impervious material of a length greater than the length of said crust; the outer convolution of said sheet being reversely bent back upon itself and helically passed in a direction opposite to the inner convolutions of said sheet; the outer terminus of said sheet being hermetically bonded to said reversely bent portion of the same; a cylindrical casing of a length less than the width of said sheet circumscribing said wrapped sheet and dough, the portions of said sheet extending outwardly from the opposite ends of said casing being flattened to form flares of a width greater than the diameter of said casing; the convolutions of each flare being bonded together to hermetically seal the opposite ends of said roll, said casing being sufficiently rigid to protect said helically wrapped crust.

4. A packaged food product comprising: a roll including an unbaked pie crust helically wrapped with a pliable sheet of a water and grease impervious material, said sheet being of a length greater than the length of said crust and the extending end portion thereof being reversely bent back upon itself to form an outer convolution helically passed in a direction opposite to the inner convolutions of said sheet; the terminus of said sheet being hermetically bonded to said reversely bent portion of the same; a cylindrical casing of a length less than the width of said sheet and greater than the width of said crust circumscribing said roll, said casing being sufficiently rigid to protect said crust, the portions of said sheet extending outwardly from the opposite ends of said casing being flattened to form flares of a width greater than the diameter of said casing; the convolutions of each flare being bonded together to hermetically seal the opposite ends of said roll.

5. A packaged food product comprising: an unbaked pie dough crush helically wrapped with a pliable sheet of a water and grease impervious material of a length greater than the length of said dough; and a radially projecting tab extending longitudinally of said wrapped sheet and dough formed of the extending end portion of said sheet reversely bent back upon itself, said end portion being helically passed in a direction opposite to the inner convolutions of said sheet to form an outer convolution terminating adjacent said tab, the extremity of said outer convolution being hermetically bonded to said tab; thereby forming the sheet into a tube enclosing the dough, the ends of said tube being hermetically sealed.

6. A packaged food product comprising: a roll including an unbaked pie crust helically wrapped with a pliable sheet of a water and grease impervious material, said sheet being of a length greater than the length of said crust and the extending end portion thereof being reversely bent back upon itself to form an outer convolution helically passed in a direction opposite to the inner convolutions of said sheet; the terminus of said sheet being hermetically bonded to said reversely bent portion of the same thereby forming the sheet into a tube enclosing the dough, the ends of said tube being hermetically sealed.

References Cited in the file of this patent

UNITED STATES PATENTS

| | | |
|---|---|---|
| 1,873,716 | Nickerson | Aug. 23, 1932 |
| 1,988,058 | Traller | Jan. 15, 1935 |
| 2,305,712 | Kaefer | Dec. 22, 1942 |
| 2,435,743 | Geimer | Feb. 10, 1948 |